Dec. 9, 1924.
F. H. MEYER
CUSHION TIRE STRUCTURE
Original Filed Nov. 25, 1922
1,518,746
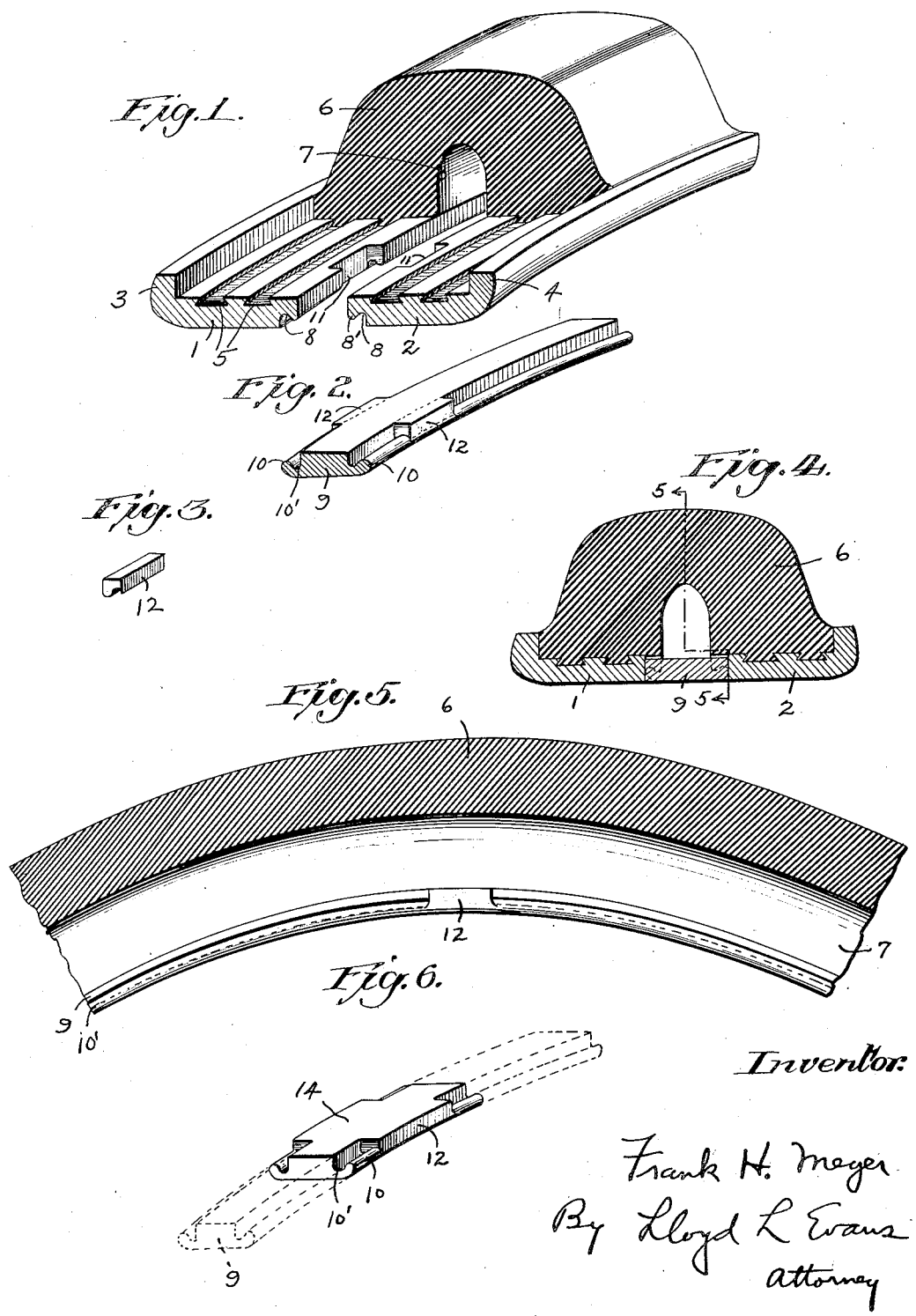

Patented Dec. 9, 1924.

1,518,746

UNITED STATES PATENT OFFICE.

FRANK H. MEYER, OF WARREN, OHIO.

CUSHION-TIRE STRUCTURE.

Original application filed November 25, 1922, Serial No. 603,289. Divided and this application filed June 30, 1924. Serial No. 723,216.

*To all whom it may concern:*

Be it known that I, FRANK H. MEYER, a citizen of the United States, residing at Warren, in the county of Trumbull and State of Ohio, have invented a certain new and useful Improvement in Cushion-Tire Structures, of which the following is a full, clear, and exact description, reference being had to the accompanying drawings.

This invention relates to tire structures and pertains more particularly to cushion tires of the type in which a tire with an inner recess or channel is molded and cured directly upon a tire base.

It is an object of the present invention to provide a cushion tire structure in which an endless spacing ring is expanded or stretched and interlocks with side sections having a tire structure secured thereto to form with said side sections a rigid base which is adapted to be forced laterally upon the fixed rim of a wheel structure.

A further object of this invention is to provide a sectional rim or base in which the central spacing ring and the outer base sections have connecting means preventing relative circumferential movement as well as relative lateral movement.

Another object of the invention is to provide such connecting means that the ring can be removed, if desired, without damaging the side sections.

This application is a division of my copending application Serial No. 603,289, filed November 25, 1922, for cushion tire structure.

Other objects will be apparent from the following description and annexed drawings.

Reference should be had to the accompanying drawings forming a part of this specification, in which—

Figure 1 is a fragmentary perspective view partly in section showing the side members of the rim and the cushion tire.

Fig. 2 is a fragmentary perspective view of a portion of the locking ring.

Fig. 3 is a detail view of a lug prior to its attachment to the ring.

Fig. 4 is a transverse section through a complete rim.

Fig. 5 is a circumferential central section through the rim.

Figure 6 shows a different way of forming the locking ring.

Referring to the drawing, the tire base is made up of a pair of annular side sections 1 and 2 which are preferably endless rings and are provided with outturned flanges 3 and 4 and peripheral locking grooves 5 for receiving the rubber tire 6. The rubber tire is of the type recessed or channeled as at 7 between the side portions, which are secured to the rim base sections 1 and 2 in a well known manner, wherein a layer of hard rubber is interlocked with suitable grooves in the base sections and the soft rubber of the arch-shaped tire is united to the hard rubber.

At their inner edges the sections 1 and 2 are grooved circumferentially at 8 to form ribs 8' to interlock with a spacing structure such as ring 9 having complementary members such as ribs 10 and grooves 10' formed along the side portions of the ring. The spacing ring 9 is of slightly smaller diameter than the sections 1 and 2 and is stretched or expanded into place between the sections in any suitable manner after the rubber tire is vulcanized on to the said sections and the cores removed.

By omitting the spacing ring until after the tire sections are secured to the base sections, an unobstructed space is provided between the side sections of the base for the insertion and removal of the core for the recess in the tire while it is vulcanized to the base sections.

The central portion of the ring 9 extends between the side sections 1 and 2 and with the interlocking connections prevents relative movement laterally of the sections when they are applied to the fixed rim of a wheel body. It is desirable, however, that these members be locked against relative circumferential or longitudinal movement so that neither of the side sections can creep circumferentially with respect to the other. For this purpose the side sections 1 and 2 are formed with notches 11 adapted to receive lugs 12 on the locking ring 9 to firmly lock the ends of the ring against movement when the ring 9 is expanded into place between the sections 1 and 2.

The opposed notches 11 may be formed in any desired shape, but preferably are simply square notches punched from the opposing edges of the sections 1 and 2 and the lug 12 may be formed separately and welded into place on the ring 9. Or if desired, the lugs 12 may be formed, as by forging, integrally with a piece of metal whose ends are shaped to match the ring 9 in cross section. In this case, as shown in Fig. 6, the insert 14 is welded at both ends to the ends of the ring 9.

To complete the tire structure the ring 9 is placed with the lugs 12 engaging the recesses 11 of the side sections upon an expanding machine (not shown) and the locking ring is then stretched to bring the flanges 10 throughout the remainder of the ring into engagement with the grooves 8 of the sections 1 and 2. One good type of expanding machine for stretching the locking ring into place is diagrammatically indicated in Patent No. 1,461,531, issued July 10, 1923.

The ribs 10 and grooves 10' of the spacing ring and the ribs 8' and grooves 8 of the side sections 1 and 2 are preferably dovetailed or undercut at such an angle that the stretching of the ring into complete engagement with the side sections is facilitated and so that they will be accurately spaced and interlocked against lateral separation when the ring is finally in position. The ring may even be made of sections which will permit stretching to a larger diameter and will interlock with the side sections to form a rigid tire structure. The inner peripheries of the ring 9 are preferably rounded to facilitate pressing the tire structure on the fixed rim of a wheel body in the ordinary manner.

When a tire is defective or worn or when it is desired to reassemble the tire structure for any reason after it has been removed from the wheel, the central ring can be pressed radially inwardly and removed without damage or injury to the side sections, which can thus be reclaimed for use in connection with another tire body.

It will be seen that the endless locking ring is expanded into a position between the side sections, so that the inner portion of the locking ring has a diameter substantially as great as the side sections.

It will also be noticed that the side sections and the ring frictionally engage the wheel throughout substantially the entire area of their inner faces so that the tire member is securely held in place. Also when the tire base is mounted on the fixed rim of a wheel body the sections of the base are held against relative circumferential and lateral movement and these sections due to their frictional engagement with each other and the tensioning in applying them to the fixed rim of the wheel are held against relative radial movement. Such a construction is as rigid in use as though the rim and side sections were permanently secured, as by welding, but the ring can be removed to reclaim the side sections for re-use.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A cushion tire structure comprising a pair of spaced side sections, an arc-shaped cushion of rubber having its legs vulcanized thereto, an endless spacing ring of substantially the same inner diameter as the side sections and disposed between said sections, said ring and sections having interengaging means to prevent relative lateral or relative circumferential movement.

2. A cushion tire structure comprising annular side sections having a cushion of rubber secured thereto, an endless spacing ring disposed between said side sections and having its inner portion of substantially the same diameter as that of the side sections, and interengaging projections and recesses carried by said ring and said side sections to prevent relative lateral and relative circumferential movement.

3. A tire base or rim structure comprising spaced annular side sections, an endless locking ring interposed between them, said side sections having their opposing edges formed with recesses therein, lugs carried by said locking ring to engage said recesses, and interengaging, annular ribs and grooves formed on said locking ring and side sections, whereby relative circumferential movement and relative lateral movement of the sections is prevented.

4. A cushion tire structure comprising spaced endless annular side sections having annular grooves adjacent their opposed inner edges, an endless spacing and locking ring having a central portion disposed between said side sections and having side portions forming ribs interfitting with said side sections and provided with tongues to engage said grooves, recesses in said side sections, lugs carried by said locking ring to engage said recesses, said endless ring being disposed between said side sections and having its inner portion of substantially the same diameter as that of the side sections.

In testimony whereof I hereunto affix my signature.

FRANK H. MEYER.